United States Patent
Liu (10) Patent No.: US 11,425,234 B2
(45) Date of Patent: Aug. 23, 2022

(54) SLIDING CONTROL METHOD FOR SLIDING ASSEMBLY, ELECTRONIC DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventor: Li Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/164,255

(22) Filed: Feb. 1, 2021

(65) Prior Publication Data
US 2021/0152679 A1    May 20, 2021

Related U.S. Application Data

(63) Continuation of application No. PCT/CN2019/091582, filed on Jun. 17, 2019.

(30) Foreign Application Priority Data

Aug. 1, 2018   (CN) .................... 201810860485.X (51) Int. Cl.
H04M 1/02    (2006.01)

(52) U.S. Cl.
CPC ....... *H04M 1/0241* (2013.01); *H04M 1/0235* (2013.01); *H04M 1/0264* (2013.01)

(58) Field of Classification Search
CPC .... G06F 1/1616; G06F 1/1681; G06F 1/1686; G06F 1/1618; G06F 1/1637;
(Continued)

(56) References Cited

U.S. PATENT DOCUMENTS

| | | |
|---|---|---|
| 7,672,700 B2 | 3/2010 | Oda |
| 2003/0142228 A1 | 7/2003 | Flach et al. |

(Continued)

FOREIGN PATENT DOCUMENTS

| | | |
|---|---|---|
| CN | 105583867 A | 5/2016 |
| CN | 105808096 A | 7/2016 |

(Continued)

OTHER PUBLICATIONS

International Search Report with English Translation of International application No. PCT/CN2019/091582, dated Aug. 28, 2019 (13pages).

(Continued)

*Primary Examiner* — Golam Sorowar
(74) *Attorney, Agent, or Firm* — Young Basile Hanlon & MacFarlane, P.C.

(57) ABSTRACT

A sliding control method for a sliding assembly, an electronic device, and a non-transitory computer-readable storage medium are disclosed. The method comprises: determining whether a current scenario feature meets a preset turn-off condition of the camera in response to detecting that the driving assembly drives the sliding assembly to slide from the first position to a target position and activating the camera; acquiring a preset slide-retracting delay duration corresponding to the current scenario feature by an application interface in response to the current scenario feature meeting the preset turn-off condition of the camera; timing until the slide-retracting delay duration expires; sending a sliding-in instruction to the driving assembly; and driving the sliding assembly to slide from the target position to the first position by the driving assembly in response to the sliding-in instruction.

19 Claims, 6 Drawing Sheets

(58) Field of Classification Search
CPC .... G06F 1/1647; G06F 1/1605; G06F 1/1626; G06F 1/1683; G06F 1/1643; G06F 1/1677; G06F 1/1669; G06F 3/04886; G06F 1/1624; G06F 1/1649; G06F 1/166; G06F 1/1641; G06F 1/1601; G06F 1/1692; G06F 1/16; G06F 3/167; G06F 3/017; G06F 3/0481; G06F 3/0488; G06F 1/1652; G06F 3/1446; G06F 1/1632; G06F 1/1679; G06F 3/041; G06F 3/04817; G06F 3/0486; G06F 3/1423; G06F 3/1438; G06F 1/1694; G06F 3/0346; G06F 2203/04803; G06F 3/0416; G06F 3/044; H04N 5/2252; H04N 5/23293; H04N 21/4316; H04N 21/47; H04N 5/232933; H04N 5/222; H04N 5/2257; H04N 5/2628; H04N 5/23216; H04N 5/2254; H04N 7/142; H04N 5/2258; H04N 5/23296; H04N 2007/145; H04N 5/232; H04N 5/23203; H04N 5/2251; H04N 5/23238; H04N 13/239; H04N 5/225251; H04N 2/232935; H04N 2213/001; H04N 5/2253; H04N 5/23245; H04N 13/296; H04N 5/23299; H04N 5/247; H04N 13/243; H04N 5/23241; H04N 5/2256; H04N 7/185; H04N 7/188; H04N 5/232411; H04N 5/2327; H04N 5/2353; H04N 7/141; H04N 5/23227; H04N 5/2625; H04N 7/144; H04N 1/00519; H04N 1/00559; H04N 13/207; H04N 13/25; H04N 13/257; H04M 1/0214; H04M 1/0216; H04M 1/0266; H04M 1/0206; H04M 1/0268; H04M 2250/18; H04M 2250/16; H04M 1/0264; H04M 1/23; H04M 1/05; H04M 1/6041; H04M 1/0247; H04M 2250/52; H04M 1/04; H04M 1/022; H04M 1/0235; H04M 1/0237; H04M 1/0243; H04M 1/72454; H04M 1/0208; H04M 1/72409; H04M 2250/20; H04M 1/0233; H04M 1/72403; H04M 1/0202; H04M 1/0218; H04M 1/0227; H04M 1/0262; H04M 1/233; H04M 1/6075; H04M 1/72412; H04M 1/72427; H04M 2250/02; H04M 2250/22; H04M 1/0231

See application file for complete search history.

(56) References Cited

U.S. PATENT DOCUMENTS

2017/0126937 A1* 5/2017 Evans, V ............. H04N 5/2254
2018/0007242 A1* 1/2018 Maatta .................. G06F 1/1692

FOREIGN PATENT DOCUMENTS

| CN | 107291351 A | | 10/2017 |
|---|---|---|---|
| CN | 107295190 A | | 10/2017 |
| CN | 107646097 A | | 1/2018 |
| CN | 108234700 A | | 6/2018 |
| CN | 109151107 A | | 1/2019 |
| CN | 109922169 A | * | 6/2019 |
| GB | 2413235 A | | 10/2005 |
| WO | 2017075092 A1 | | 5/2017 |

OTHER PUBLICATIONS

Chinese First Office Action with English Translation of Application No. 201810860485.X, dated Sep. 30, 2019(9 pages).
Extended European Search Report for EP Application 19843418.5 dated Aug. 25, 2021. (13 pages).

* cited by examiner

| | |
|---|---|
| Determining whether a current scenario feature meets a preset turn-off condition of the camera in response to detecting that the driving assembly drives the sliding assembly to slide from the first position to a target position and activating the camera | 601 |
| Acquiring a preset slide-retracting delay duration corresponding to the current scenario feature by an application interface in response to the current scenario feature meeting the preset turn-off condition of the camera | 602 |
| Timing until the slide-retracting delay duration expires; sending a sliding-in instruction to the driving assembly; and driving the sliding assembly to slide from the target position to the first position by the driving assembly in response to the sliding-in instruction | 603 |

SLIDING CONTROL METHOD FOR SLIDING ASSEMBLY, ELECTRONIC DEVICE, AND NON-TRANSITORY COMPUTER-READABLE STORAGE MEDIUM

CROSS-REFERENCE TO RELATED APPLICATION(S)

The present disclosure is a continuation-application of International (PCT) Patent Application No. PCT/CN2019/091582 filed on Jun. 17, 2019, which claims priority to Chinese Patent Application No. 201810860485.X, filed on Aug. 1, 2018, the contents of both of which are herein incorporated by reference in their entireties.

TECHNICAL FIELD

The present disclosure relates to the field of electronic technology, and in particular to a sliding control method for a sliding assembly, an electronic device, and a non-transitory computer-readable storage medium.

BACKGROUND

In order to improve user experience, screen-to-body ratios of electronic devices such as mobile terminals are increasing, and a full-screen design is even proposed.

In the related art, in order to increase the screen-to-body ratio, some cameras arranged on a front panel of an electronic device, such as front cameras, are hidden. Therefore, how to use and control the camera in different usage scenarios becomes an urgent problem to be solved.

SUMMARY

The present disclosure discloses a sliding control method and a device for a sliding assembly, an electronic device, and a non-transitory computer-readable storage medium.

In some aspects, the present disclosure discloses a sliding control method for a sliding assembly of an electronic device. The electronic device comprises a body and a driving assembly, and the driving assembly is configured to drive the sliding assembly to slide between a first position in which the sliding assembly is received in the body and a second position in which the sliding assembly is exposed from the body. A camera is disposed on the sliding assembly. The method comprises: determining whether a current scenario feature meets a preset turn-off condition of the camera in response to detecting that the driving assembly drives the sliding assembly to slide from the first position to a target position and activating the camera; acquiring a preset slide-retracting delay duration corresponding to the current scenario feature by an application interface in response to the current scenario feature meeting the preset turn-off condition of the camera; timing until the slide-retracting delay duration expires; sending a sliding-in instruction to the driving assembly; and driving the sliding assembly to slide from the target position to the first position by the driving assembly in response to the sliding-in instruction.

In some aspects, the present disclosure discloses an electronic device. The electronic device comprises a body and a driving assembly, and the driving assembly is configured to drive the sliding assembly to slide between a first position in which the sliding assembly is received in the body and a second position in which the sliding assembly is exposed from the body. A camera is disposed on the sliding assembly. The electronic device further comprises: a memory; a processor, electrically connected to the sliding assembly; and a computer program, stored on the memory and executable by the processor. The processor performs the sliding control method for the sliding assembly as previously described, in response to executing the computer program.

In some aspects, the present disclosure discloses a computer-readable storage medium storing a computer program which, when executed by a processor, causes to the processor to perform the sliding control method for the sliding assembly as previously described.

In some aspects, the present disclosure discloses a non-transitory computer program product. When instructions in the computer program product are executed by the processor, the sliding control method for the sliding assembly as previously described may be executed.

The additional aspects and advantages of the present disclosure will be partly given in the following description, and some will become obvious from the following description, or be understood through the practice of the present disclosure.

BRIEF DESCRIPTION OF DRAWINGS

The above and/or additional aspects and advantages of the present disclosure will become apparent and readily understood from the description to the embodiments with reference to the drawings.

REFERENCE NUMERALS OF MAIN COMPONENTS

Electronic device 100, body 10, main board 12, sliding groove 16, sub-groove 162, sliding assembly 20, carrier 22, threaded hole 24, rotating screw 26, memory 30, processor 31, magnet 32, magnetic field detector 34, camera 42, receiver 44, driving assembly 50, driving motor 52, distance sensor 70, first distance sensor 71, second distance sensor 72, first position A, and second position B.

DETAILED DESCRIPTION

The embodiments of the present disclosure will be described in detail below. Examples of the embodiments may be illustrated in the drawings. Same or similar reference numerals may be used to indicate same or similar elements or elements having same or similar functions. The embodiments described below with reference to the drawings are illustrative, and are not intended to be construed as limiting.

In the description of the embodiments of the present disclosure, it should be understood that, the orientation or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", or the like, are based on the orientation or positional relationship shown in the drawings, and are merely for convenience of description and for simplifying description, rather than implying or indicating that the device or the component must have a particular orientation or constructed and operated in a particular orientation, and thus these terms cannot to be construed as limiting the present disclosure. In addition, terms such as "first", "second", or the like, are used herein for purposes of description, and are not intended to indicate or imply relative importance or significance or to imply the number of indicated technical features. Thus, the feature defined with "first", "second", or the like may include one or more of such a feature. In the description of the present disclosure, it should be noted that, "a plurality of" means two or more, unless specified otherwise.

In the present disclosure, it should be noted that, unless specified or limited, otherwise, terms "mounted", "connected", "connected", or the like may be used in a broad sense, and may include, for example, fixed connections, detachable connections, or integral connections; may also be mechanical, electrical connections, or communications; may also be direct connections or indirect connections via intervening structures; may also be inner communications of two elements, as can be understood by one skilled in the art depending on specific contexts. For those skilled in the art, the specific meanings of these terms in the present disclosure will be understood according to the specific conditions.

In the present disclosure, unless specified or limited, otherwise, a first feature being located "above" or "below" a second feature may comprise an embodiment in which the first feature is in direct contact with the second feature and an embodiment in which another feature is formed between the first and the second features such that the first feature is not in direct contact with the second feature. Moreover, the first feature being disposed "on", "above", and "upon" the second feature may indicate that the first feature is disposed directly above and obliquely above the second feature, or merely indicate that the first feature is at a higher level than the second feature. The first feature being disposed "below", "under" and "beneath" the second feature may indicate that the first feature is disposed directly below and obliquely below the second feature, or merely indicate that the first feature is at a lower level than the second feature.

The following disclosure provides many different embodiments or examples for implementing different structures of the present disclosure. In order to simplify the present disclosure, components and arrangements of specific examples are described below. Of course, these are merely examples, and are not intended to limit the present disclosure. In addition, reference numerals and/or reference letters are repeated in different examples of the present disclosure. The repetition is for the purpose of simplicity and clarity, and do not indicate the relationship between various embodiments and/or arrangements discussed herein. Moreover, examples of various specific processes and materials are provided in the present disclosure. However, those skilled in the art may recognize applications of other processes and/or usages of other materials.

In some aspects, the present disclosure discloses a sliding control method for a sliding assembly of an electronic device. The electronic device comprises a body and a driving assembly, and the driving assembly is configured to drive the sliding assembly to slide between a first position in which the sliding assembly is received in the body and a second position in which the sliding assembly is exposed from the body. A camera is disposed on the sliding assembly. The method comprises: determining whether a current scenario feature meets a preset turn-off condition of the camera in response to detecting that the driving assembly drives the sliding assembly to slide from the first position to a target position and activating the camera; acquiring a preset slide-retracting delay duration corresponding to the current scenario feature by an application interface in response to the current scenario feature meeting the preset turn-off condition of the camera; timing until the slide-retracting delay duration expires; sending a sliding-in instruction to the driving assembly; and driving the sliding assembly to slide from the target position to the first position by the driving assembly in response to the sliding-in instruction.

In some embodiments, the method further comprises: providing a control interface; acquiring a corresponding relationship between the scenario feature and the slide-retracting delay duration, wherein the corresponding relationship is preset via the control interface; and storing the corresponding relationship.

In some embodiments, the acquiring the preset slide-retracting delay duration corresponding to the current scenario feature by the application interface in response to the current scenario feature meeting the preset turn-off condition of the camera, comprises: determining that the current scenario feature meets the preset turn-off condition of the camera in response to acquiring a turn-off instruction to the camera sent by an application currently performing the camera; and acquiring an identifier of the application and acquiring the preset slide-retracting delay duration by the application interface, wherein the preset slide-retracting delay duration corresponds to the identifier of the application and the turn-off instruction.

In some embodiments, the acquiring the preset slide-retracting delay duration corresponding to the current scenario feature by the application interface in response to the current scenario feature meeting the preset turn-off condition of the camera, comprises: monitoring a data stream of an audio component during a scenario of an application performing video communication via the camera; determining that the current scenario feature meets the preset turn-off condition of the camera in response to monitoring no data stream of the audio component within a preset time; and acquiring the preset slide-retracting delay duration by the application interface, wherein the preset slide-retracting delay duration corresponds to the scenario of the application performing the video communication.

In some embodiments, after determining that the current scenario feature meets the preset turn-off condition of the camera in response to monitoring no data stream of the audio component within the preset time, the method further comprises: acquiring an identifier of the application performing the video communication via the camera; and acquiring the preset slide-retracting delay duration by the application interface, wherein the preset slide-retracting delay duration corresponds to the identifier of the application performing the video communication.

In some embodiments, the acquiring the preset slide-retracting delay duration corresponding to the current scenario feature by the application interface in response to the current scenario feature meeting the preset turn-off condition of the camera, comprises: determining whether an application calls an audio component in response to monitoring that the application performing the camera switches from a foreground to a background; determining whether the audio component has a data stream within a preset time in response to the application calling the audio component; determining that the current scenario feature meets the preset turn-off condition of the camera in response to the application calling no audio component; and acquiring the preset slide-retracting delay duration by the application interface in response to the current scenario feature meeting the preset turn-off condition of the camera, wherein the preset slide-retracting delay duration corresponds to an identifier of the application.

In some embodiments, the driving the sliding assembly to slide from the target position to the first position by the driving assembly, comprises: acquiring a sliding speed corresponding to the current scenario feature, and driving the sliding assembly to slide from the target position to the first position by the driving assembly in response to the sliding speed; or acquiring a sliding duration corresponding to the current scenario feature, and driving the sliding assembly to slide from the target position to the first position by the driving assembly in response to the sliding duration; or determining the sliding speed corresponding to the sliding assembly according to the target position, the first position, and the sliding duration in response to acquiring the sliding duration corresponding to the current scenario feature, and driving the sliding assembly to slide from the target position to the first position by the driving assembly in response to the sliding speed.

In some embodiments, the timing until the slide-retracting delay duration expires, comprises: maintaining the sliding assembly to stay at the target position by the driving assembly in response to detecting that the slide-retracting delay duration meets a preset timing-interruption state.

In some aspects, the present disclosure discloses an electronic device. The electronic device comprises a body and a driving assembly, and the driving assembly is configured to drive the sliding assembly to slide between a first position in which the sliding assembly is received in the body and a second position in which the sliding assembly is exposed from the body. A camera is disposed on the sliding assembly. The electronic device further comprises: a memory; a processor, electrically connected to the sliding assembly; and a computer program, stored on the memory and executable by the processor. In response to executing the computer program, the processor performs the sliding control method for the sliding assembly as previously described.

In some embodiments, a magnet is disposed on one of the sliding assembly and the body, a magnetic field detector is disposed on the other of the sliding assembly and the body, and the magnetic field detector is electrically connected to the processor.

In some embodiments, the memory and the processor are arranged on a main board inside the body, and the main board is fixedly connected to the body; the magnet is arranged on the sliding assembly, and the magnetic field detector is arranged on the main board; or the magnet is arranged on the main board, and the magnetic field detector is arranged on the sliding assembly.

In some embodiments, the magnetic field detector is a Hall element; the processor is configured to receive a detection signal value output by the Hall element and determine a position of the sliding assembly relative to the body based on the detection signal value.

In some embodiments, at least two distance sensors are disposed on the sliding assembly, a line connecting the at least two distance sensors is not perpendicular to a sliding direction of the sliding assembly, and the distance sensor is electrically connected to the processor. The processor is configured to receive detection signal values of the at least two distance sensors and determine a position of the sliding assembly relative to the body based on the at least two detection signal values.

In some aspects, the present disclosure discloses a non-transitory computer-readable storage medium storing a computer program which, when executed by a processor, causes to the processor to perform the sliding control method for the sliding assembly as previously described.

Firstly, an electronic device 100 proposed in the present disclosure will be described in detail with reference to FIGS. 1 to 5.

As shown in FIG. 1 to FIG. 5, the electronic device 100 may include a body 10, a sliding assembly 20, and a driving assembly 50. A camera 42 may be disposed on the sliding assembly 20. The sliding assembly 20 may be slidable between a first position A in which the sliding assembly 20 is received in the body 10 and a second position B in which the sliding assembly 20 is exposed from the body 10. The electronic device 100 may further include: a memory 30, a processor 31 electrically connected to the sliding assembly 20 and the driving assembly 50, and a computer program stored in the memory 30 and capable of running on the processor 31. The processor 31 may be configured to perform a sliding control method for the sliding assembly. That is to say, the processor 31 may be configured to: determine whether a current scenario feature meets a preset turn-off condition of the camera in response to detecting that the driving assembly 50 drives the sliding assembly 20 to slide from the first position A to a target position and activating or calling the camera 42; acquire a preset slide-retracting delay duration corresponding to the current scenario feature by an application interface in response to the current scenario feature meeting the preset turn-off condition of the camera; send a sliding-in instruction including the slide-retracting delay duration to the driving assembly 50, and drive, by the driving assembly 50, the sliding assembly 20 to slide from the target position to the first position after the slide-retracting delay duration expires.

It should be noted that, the description of the sliding control method for the sliding assembly may refer to the related description in the subsequent method embodiments, and will not be repeated in this embodiment.

Figure 1:
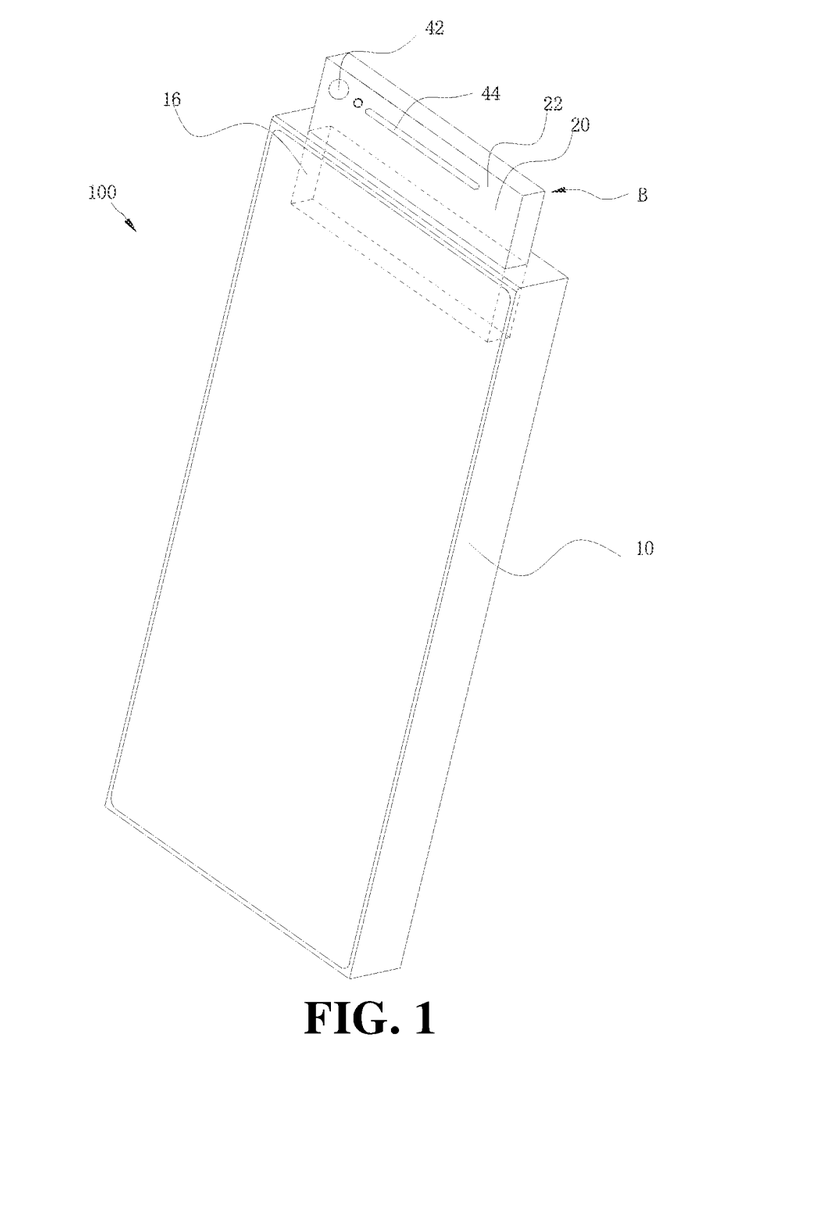
FIG. 1 is a schematic view of an electronic device in a second position according to some embodiments of the present disclosure.
Figure 2:
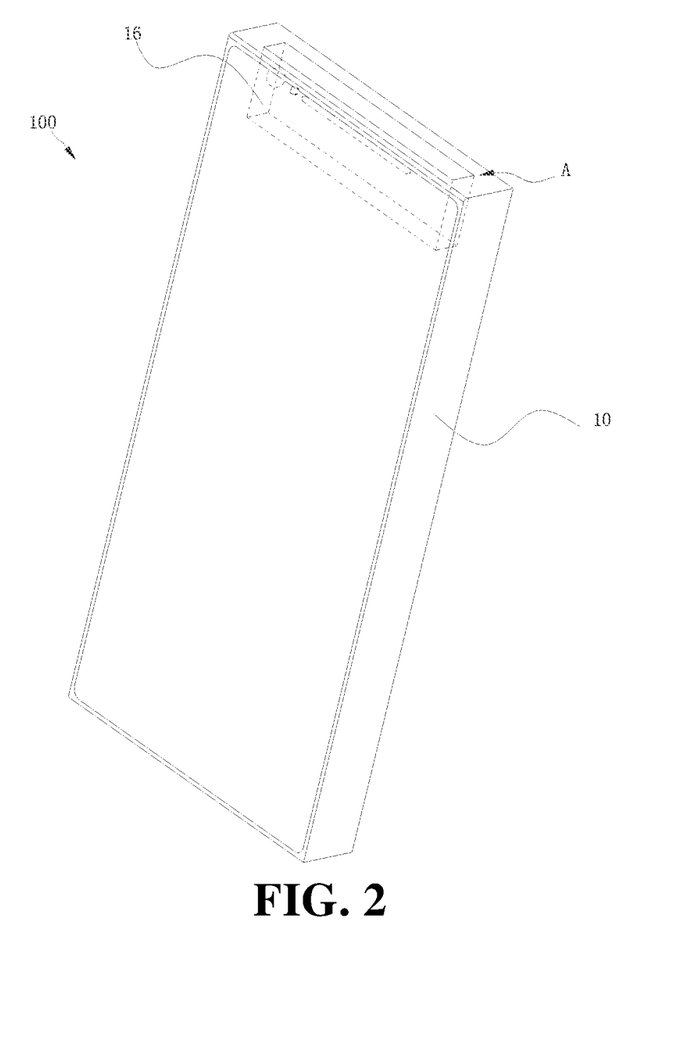
FIG. 2 is a schematic view of the electronic device in a first position according to some embodiments of the present disclosure.

As shown in FIG. 1, in some embodiments, the electronic device 100 may include the camera 42. The sliding assembly 20 may include a carrier 22, and the camera 42 may be disposed on the carrier 22. In this way, the camera 42 may slide along with the sliding assembly 20. Of course, a user turning on the camera 42 and turning off the camera 42 may also be used as a trigger signal, that is, the sliding assembly 20 may be triggered to slide out in response to the user turning on the camera 42, and the sliding assembly 20 may be triggered to slide back in response to the user turning off the camera 42. In this way, the user only needs to turn on or off the camera according to an existing habit, and does not need to perform additional operations on the sliding assembly 20, which may be convenient for the user to use.

In addition to the camera 42, the carrier 22 may also carry other electronic components, such as a light sensor, a proximity sensor, and a receiver 44, or the like, as shown in FIG. 1. It should be understood that, the camera 42 may be exposed from the body 10 along with the sliding assembly 20 sliding out of the body 10 according to or based on or in response to a user input. Thus, the camera 42 may work normally. Or, the camera 42 may be received in the body 10 along with the sliding assembly 20 sliding back into the body 10 according to or in response to another user input. In this way, it is possible to define as few through holes as possible on a display assembly (not shown in the figures), which may facilitate meeting design requirements of a full screen of the electronic device 100.

In some embodiments, the body 10 may define a sliding groove 16. The sliding assembly 20 may be received in the sliding groove 16 when the sliding assembly 20 is in the second position B. The sliding assembly 20 may be located out of the sliding groove 16 when the sliding assembly 20 is in the first position A. In this way, the sliding assembly 20 may be slidable between the first position A and the second position B via the sliding groove 16.

Figure 5:
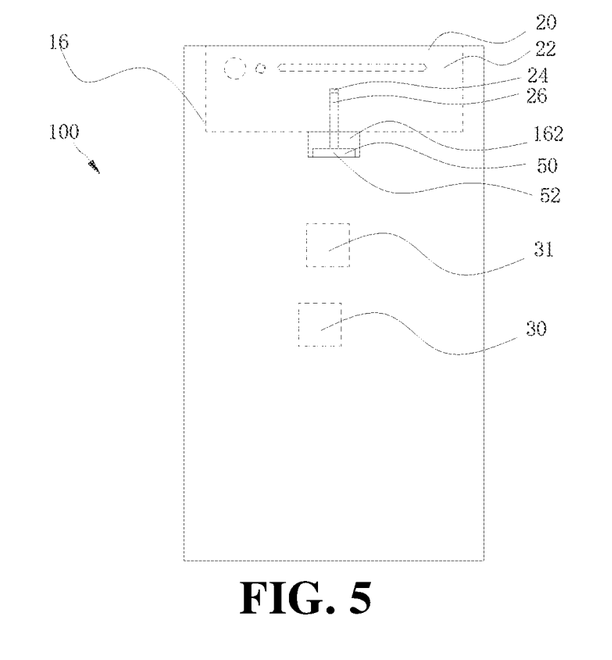
FIG. 5 is a schematic structural view of the electronic device according to some embodiments of the present disclosure.

As shown in FIG. 5, in some embodiments, the sliding assembly 20 may include a threaded hole 24 and a rotating screw 26. The threaded hole 24 may be defined in a middle of the carrier 22. The rotating screw 26 may cooperate with or mating with the threaded hole 24. The sliding groove 16 may include a sub-groove 162 disposed opposite to or facing the threaded hole 24 and located at a bottom of the sliding groove 16. The sliding groove 16 may further include an additional sub-groove (not labeled) fluidly coupled to the sub-groove 162. The additional sub-groove may be configured to receive the sliding assembly 20. When the sliding assembly 20 is in the first position A, the additional sub-groove may be disposed closer to the camera 42 than sub-groove 162. The electronic device 100 may include the driving assembly 50 disposed in the sub-groove 162. The driving assembly 50 may include a driving motor 52 connected to the processor 31 and an output shaft (not shown) connected to a bottom of the rotating screw 26.

It may be understood that the processor 31 may control the sliding of the sliding assembly 20 by controlling the driving motor 52. In response to the user instructing the sliding assembly 20 to slide from the first position A to the second position B, the processor 31 may control the driving motor 52 to rotate forward, and the output shaft of the driving motor 52 may drive the rotating screw 26 to rotate in the threaded hole 24, thereby driving the sliding assembly 20 to slide from the first position A to the second position B. In response to the user instructing the sliding assembly 20 to slide from the second position B to the first position A, the processor 31 may control the driving motor 52 to rotate reversely, and the output shaft of the driving motor 52 may drive the rotating screw 26 to rotate in the threaded hole 24, thereby driving the sliding assembly 20 to slide from the second position B to the first position A. It may be worth noting that "from the first position A to the second position B" and "from the second position B to the first position A" may refer to a direction of sliding, rather than limiting starting and ending points of sliding.

In some embodiments of the present disclosure, the position of the sliding assembly 20 relative to the body 10 may be determined in various implementations.

Implementation One

A current position of the sliding assembly 20 relative to the body 10 may be determined by a magnet and a magnetic field detector. It should be noted that, the number of the magnetic field detectors may be one, however, the number of the magnetic field detectors may also be two or more. In some embodiments of the present disclosure, one magnetic field detectors will be taken as an example for description.

More specifically, a magnet 32 may be disposed on one of the sliding assembly 20 and the body 10, and a magnetic field detector 34 may be disposed on the other of the sliding assembly 20 and the body 10. The magnetic field detector 34 may be electrically connected to the processor 31. That is, the magnet 32 and the magnetic field detector 34 may be arranged in two ways. In one way, the magnet 32 is arranged on the sliding assembly 20, while the magnetic field detector 34 is arranged on the body 10. In another way, the magnetic field detector 34 is arranged on the sliding assembly 20, while the magnet 32 is arranged on the body 10. In addition, the magnet 32 and the magnetic field detector 34 may be arranged opposite to each other or facing towards each other in a vertical direction or in a horizontal direction. In other words, as long as the magnet 32 and the magnetic field detector 34 may produce relative motion, the specific positions of the magnet 32 and the magnetic field detector 34 may not be restricted.

In some specific implementations, a main board 12 may be disposed inside the body 10, and the memory 30 and the processor 31 may be both disposed on the main board 12 inside the body 10. The main board 12 may be fixedly connected to the body 10. Correspondingly, the magnet 32 may be disposed on the sliding assembly 20, and the magnetic field detector 34 may be arranged on the main board 12. In some embodiments, the magnet 32 may be arranged on the main board 12, and the magnetic field detector 34 may be arranged on the sliding assembly 20.

Figure 3:
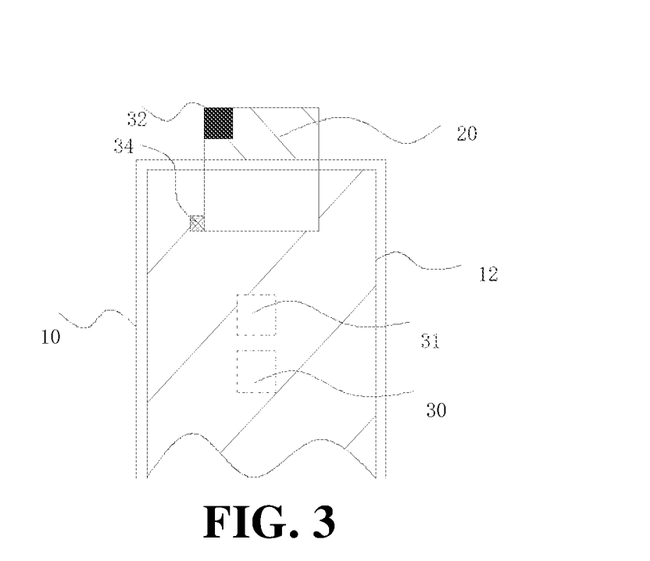
FIG. 3 is a schematic structural view of the electronic device according to some embodiments of the present disclosure.

In some embodiments, it should be noted that, in FIG. 3, the arrangement of arranging the magnet 32 on the sliding assembly 20 and arranging the magnetic field detector 34 on the main board 12 will be taken as an example for illustration.

In some embodiments, the magnetic field detector 34 may be a Hall element or any other element that may sense the magnetic field generated by the magnet and output a corresponding signal according to or based on the sensed magnetic induction intensity. In case that the magnetic field detector 34 is a Hall element, the processor 31 may be also configured to receive a value of a detection signal output by the Hall element, and determine the current position of the sliding assembly 20 relative to the body 10 according to or based on or in response to the value of the detection signal.

Hereinafter, taking the magnetic field detector 34 as a Hall element as an example, the process of determining the current position of the sliding assembly 20 relative to the body 10 by the processor 31 in some embodiments of the present disclosure will be described.

In some embodiments of the present disclosure, the current position of the sliding assembly 20 relative to the body 10 may be determined based on the characteristics of the Hall element. That is, the Hall element may sense the magnetic field generated by the magnet 32 and output a signal corresponding to the sensed magnetic induction intensity to determine the current position of the sliding assembly 20 relative to the body 10. Since the magnetic induction intensity is related to the current position of the Hall element relative to the magnet 32, the position of the Hall element relative to the magnet 32 may be determined by the value of the detection signal output by the Hall element. In addition, since one of the magnet 32 and the Hall element is fixedly disposed on the sliding assembly 20, and the other of the magnet 32 and the Hall element is fixedly disposed on the body 10, the magnet 32 and the Hall element may move relative to each other along with the movement of the sliding assembly 20. Therefore, it is possible to determine the position of the sliding assembly 20 relative to the body 10 by determining the position of the Hall element relative to the magnet 32.

In some specific implementations, the sliding assembly 20 may be slid to a plurality of calibrated relative positions in advance. The value of the detection signal output by the Hall element corresponding to each calibrated relative position may be acquired and be further used as a preset signal value corresponding to each calibrated relative position. A plurality of preset signal values and the plurality of calibration relative positions may be associated or mapped into a look-up table or fit to a relationship curve. The look-up table or the relationship curve may include the plurality of preset signal values and the plurality of calibration relative positions. Each preset signal value may correspond to one calibrated relative position. Therefore, after the processor 31 receives the value of the detection signal output by the Hall element, the current position of the sliding assembly 20 relative to the body 10 may be determined by reverse deduction by looking up the pre-generated look-up table or the relationship curve based on the value of the detection signal of the Hall element.

Implementation Two

The current position of the sliding assembly 20 relative to the body 10 may be determined by a distance sensor. In some embodiments, the distance sensor may be any sensor capable of detecting a distance, such as an infrared distance sensor, an ultrasonic displacement sensor, or the like.

Figure 4:
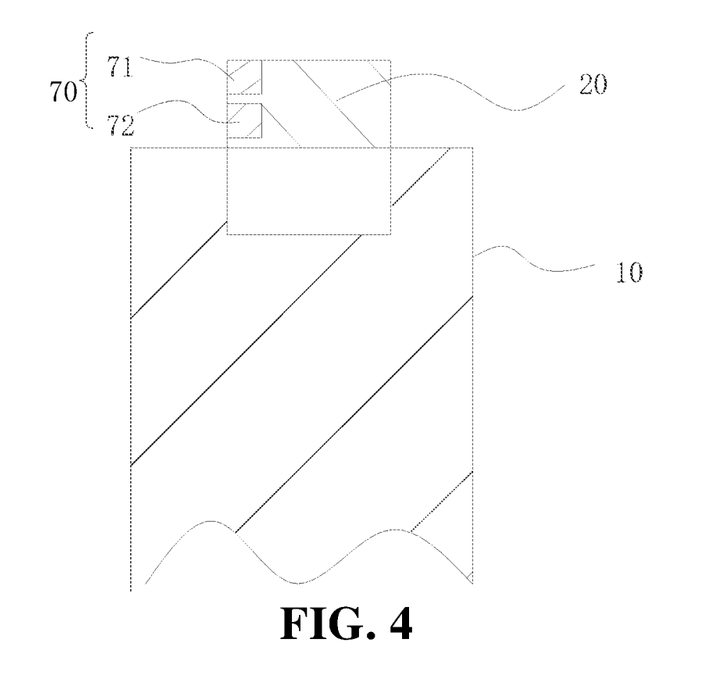
FIG. 4 is a schematic structural view of the electronic device according to some embodiments of the present disclosure.

As shown in FIG. 4, a distance sensor 70 may be disposed on the sliding assembly 20. In some embodiments, the number of the distance sensors 70 may be at least two. Besides, a line connecting the at least two distance sensors 70 is not perpendicular to the sliding direction of the sliding assembly 20. The at least two distance sensors 70 may be electrically connected to the processor 31. The processor 31 may be further configured to receive values of detection signals acquired by the at least two distance sensors 70, and determine the current position of the sliding assembly 20 relative to the body 10 according to/based on/by utilizing the at least two values of detection signals.

It should be noted that in FIG. 4, a first distance sensor 71 and a second distance sensor 72 may be disposed on the sliding assembly 20. The line connecting the first distance sensor 71 with the second distance sensor 72 may be substantially parallel to the sliding direction of the sliding assembly 20.

Hereinafter, the first distance sensor 71 and the second distance sensor 72 may be implemented as infrared distance sensors, and the process of determining the current position of the sliding assembly 20 relative to the body 10 by the processor 31 in some embodiments of the present disclosure will be described.

In some embodiments of the present disclosure, the current position of the sliding assembly 20 relative to the body 10 may be determined by utilizing the distance determination functions of the first distance sensor 71 and the second distance sensor 72. The infrared distance sensor may include an infrared emitter and an infrared receiver. In case that a time period from a first time point at which infrared light is emitted by the infrared emitter to a second time point in which the infrared light is received by the infrared receiver is short, it indicates that the distance is short. However, in case that a time period from the first time point at which the infrared light is emitted by the infrared emitter to the second time point in which the infrared light is received by the infrared receiver is long, it indicates that the distance is long or far. In some embodiments of the present disclosure, the measured distance may be the relative distance between the first distance sensor 71 and the body 10, and the relative distance between and the second distance sensor 72 and the body 10.

The relative distance between the first distance sensor 71 and the body 10, and the relative distance between and the second distance sensor 72 and the body 10 may be determined by a sum of a measured time period of the first distance sensor 71 and a measured time period of the second distance sensor 72. Since a length of time period is related to the position relative to the first distance sensor 71 and the second distance sensor 72, and the length of time period is also related to a length of the distance, the farther the sliding assembly 20 slides out, the longer the length of receiving time period. By analyzing the length of the time period, it is possible to determine whether the sliding assembly 20 is in the first position A, in the second position B, or between the first position A and the second position B. Therefore, it is possible to determine the current positions of the first distance sensor 71 and the second distance sensor 72 relative to the body 10 by utilizing signals output by the first distance sensor 71 and the second distance sensor 72.

In addition, since the first distance sensor 71 and the second distance sensor 72 are respectively fixed on the sliding assembly 20, the first distance sensor 71 and the second distance sensor 72 may produce relative movements along with the movement of the sliding assembly 20. Therefore, the position of the sliding assembly 20 relative to the body 10 may be determined indirectly by determining the positions of the second distance sensor 72 and the first distance sensor 71 relative to the body 10.

In some specific implementations, the sliding assembly 20 may be slid to a plurality of calibrated relative positions in advance. The values of the detection signals output by the first distance sensor 71 and the second distance sensor 72 corresponding to each calibrated relative position may be acquired and be further used as preset signal values corresponding to each calibrated relative position. Then a plurality of preset signal values and the plurality of calibration relative positions may be associated or mapped into a look-up table or fit to a relationship curve. The look-up table or the relationship curve may include the plurality of preset signal values and the plurality of calibration relative positions. Each preset signal value may correspond to one calibrated relative position. Therefore, after the processor 31 receives the values of the detection signals output by the first distance sensor 71 and the second distance sensor 72, the current position of the sliding assembly 20 relative to the body 10 may be determined by reverse deduction by looking up the pre-generated look-up table or the relationship curve based on the detection signal values.

A sliding control method for the sliding assembly according to some embodiments of the present disclosure based on the structure of the electronic device 100 shown in FIGS. 1-5 will be described below.

Figure 6:
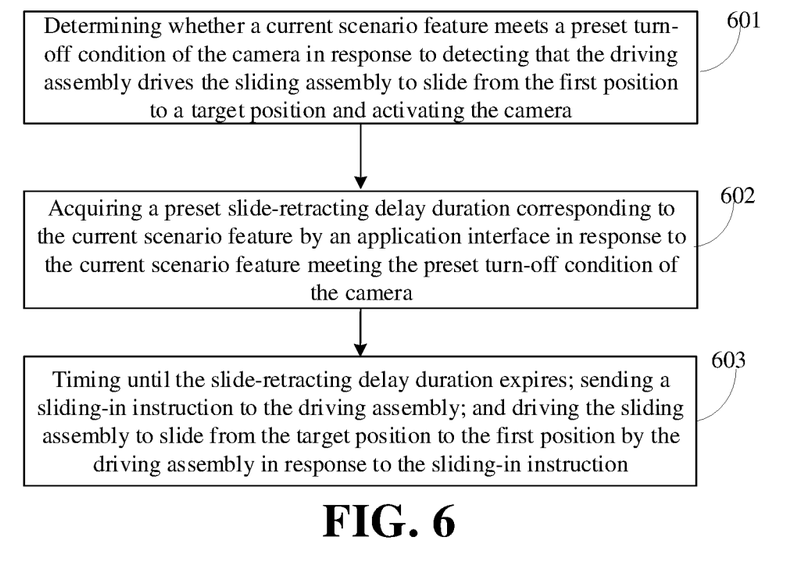
FIG. 6 is a flowchart of a sliding control method of a sliding assembly according to some embodiments of the present disclosure.

FIG. 6 is a flowchart of a sliding control method of the sliding assembly according to some embodiments of the present disclosure.

As shown in FIG. 6, the sliding control method may include operations executed by the following blocks.

At block 601, whether a current scenario feature meets a preset turn-off condition of the camera may be determined in response to detecting that the driving assembly drives the sliding assembly to slide from the first position to a target position and activating the camera.

The target position may be the second position, or a position between the first position and the second position, which may be not limited in some embodiments of the present disclosure.

In some embodiments, the preset turn-off condition of the camera may be a condition for turning off the camera. For example, the preset turn-off conditions of the camera may include, but may not be limited to, sending a turn-off instruction to turn off the camera by an application utilizing, calling, or performing the camera; detecting no data stream of an audio component within the preset time (that is, detecting no data stream in input and output interfaces of the audio component within the preset time) in response to receiving a call request, answering the call request, or the application performing video communication via the camera when running the application that calls or performs the camera in the foreground; the application that calls or performs the camera switching from the foreground to the background, or the like.

At block 602, a preset slide-retracting delay duration corresponding to the current scenario feature may be acquired (such as reading) by an application interface in response to the current scenario feature meeting the preset turn-off condition of the camera.

In some embodiments, it should be understood that, different scenario features correspond to different slide-retracting delay durations.

At block 603, timing may be performed until the slide-retracting delay duration expires. A sliding-in instruction is sent to the driving assembly in response to the slide-retracting delay duration expiring. The sliding assembly is driven to slide from the target position to the first position by the driving assembly according to or in response to the sliding-in instruction.

It should be noted that, during the process of the driving assembly waiting for the expiring of the slide-retracting delay duration, the sliding assembly may be maintained to stay at the target position by the driving assembly in response to detecting that the slide-retracting delay duration meets a preset timing-interruption state (that is, the timing is interrupted). In this way, it is possible to reduce the occurrences of sliding the sliding assembly in and out frequently, thereby reducing a worn of the sliding structure, reducing a power consumption of the electronic device, and further improving the user experience.

In some embodiments, the preset timing-interruption state may include, but may not be limited to, receiving a sliding-out request for the sliding assembly within the slide-retracting delay duration, receiving a calling request for the camera from other applications or the current application within the slide-retracting delay duration, or the like.

In the sliding control method for the sliding assembly according to some embodiments of the present disclosure, whether a current scenario feature meets a preset turn-off condition of the camera may be determined in response to detecting that the driving assembly drives the sliding assembly to slide from the first position to a target position and activating the camera; a preset slide-retracting delay duration corresponding to the current scenario feature may be acquired by an application interface in response to the current scenario feature meeting the preset turn-off condition of the camera; timing may be performed until the slide-retracting delay duration expires; the sliding-in instruction is sent to the driving assembly in response to the slide-retracting delay duration expiring; and the sliding assembly may be driven to slide from the target position to the first position by the driving assembly according to or in response to the sliding-in instruction. In this way, by utilizing the slide-retracting delay duration corresponding to the scenario feature to realize the sliding control of the sliding assembly, it is possible to meet the requirements of different slide-retracting delay durations corresponding to different scenario features, the control of the sliding assembly may be automatically realized in combination with the scenario features, and the user experience may be improved.

Based on the foregoing embodiments, in order to better control the sliding of the sliding assembly in combination with the scenario features, in some exemplary implementations, before driving the sliding assembly to slide from the target position to the first position by the driving assembly, a sliding speed corresponding to the scenario feature may also be acquired. The sliding assembly may be driven to slide from the target position to the first position according to or in response to the sliding speed corresponding to the scenario feature. In this way, it is possible to manage and control the sliding speed of the sliding assembly in combination with the scenario feature, the control of the sliding assembly may be automatically realized in combination with the scenario feature, and the user experience may be improved.

Based on the foregoing embodiments, in order to better control the sliding of the sliding assembly in combination with the scenario features, in some exemplary implementations, before driving the sliding assembly to slide from the target position to the first position, a sliding duration corresponding to the scenario feature may also be acquired. The sliding assembly may be driven to slide from the target position to the first position according to or in response to the sliding duration corresponding to the scenario feature. In this way, it is possible to manage and control the sliding duration of the sliding assembly in combination with the scenario feature, the control of the sliding assembly may be automatically realized in combination with the scenario feature, and the user experience may be improved.

In some exemplary implementations, after acquiring the sliding duration corresponding to the scenario feature, the driving assembly may determine the sliding speed corresponding to the sliding assembly according to or based on or in response to the target position, the first position, and the sliding duration corresponding to the scenario feature, and drive the sliding assembly to slide from the target position to the first position according to or in response to the determined sliding speed. In this way, it is possible to manage and control the sliding duration of the sliding assembly in combination with the scenario feature, the control of the sliding assembly may be automatically realized in combination with the scenario feature, and the user experience may be improved.

Figure 7:
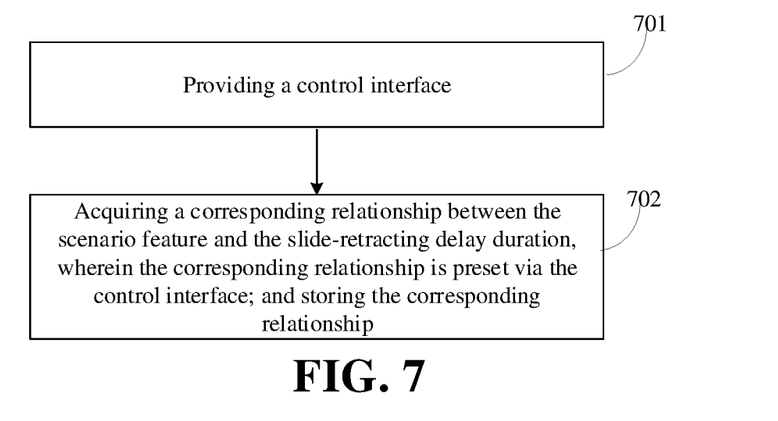
FIG. 7 is a flowchart of a sliding control method of a sliding assembly according to some embodiments of the present disclosure.

Based on any of the foregoing embodiments, in order to meet the requirements of the user for personalizing of the scenario features and the slide-retracting delay durations, in some exemplary implementations, as shown in FIG. 7, the sliding control method may further include operations executed by the following blocks.

At block 701, a control interface may be provided.

At block 702, a corresponding relationship between the scenario feature and the slide-retracting delay duration may be acquired. In some embodiments, the corresponding relationship is preset by the user via the control interface according to requirements, and the corresponding relationship may be stored.

In some embodiments, it should be noted that, the electronic device may store the corresponding relationship between the scenario feature and the slide-retracting delay duration in various ways. For example, the corresponding relationship between the scenario feature and the slide-retracting delay duration may be stored in a database or an eXtensible Markup Language (XML) file.

In some embodiments, it should be understood that, in actual applications, a storage mode of the corresponding relationship may be selected according to scenario requirements, which may be not limited in some embodiments of the present disclosure.

In some examples, by providing a control interface, it is convenient for the user to set the corresponding relationship between the scenario feature and the slide-retracting delay duration according to his or her own preference, which satisfies the requirements of the user for personalizing the slide-retracting delay duration of the scenario feature and satisfies differentiated demands of the user.

For example, in case that an application A installed in the electronic device turns off the camera, the slide-retracting delay duration corresponding to the application A may be substantially 1.5 seconds. In case that the user thinks that the slide-retracting delay duration of 1.5 seconds is too short to meet their needs, the user may set the slide-retracting delay duration corresponding to the application A to the time desired by the user through the control interface, such as 3 seconds. In subsequent process, the turn-off instruction may be acquired from the electronic device and the slide-retracting delay duration corresponding to the application A may be 3 seconds at this time in response to the application A in the electronic device calling or performing the camera and sending a turn-off instruction to turn off the camera. Then, an intermediate service layer in the electronic device may be controlled to start timing according to the slide-retracting delay duration. A sliding-in instruction may be sent to the driving assembly in response to the slide-retracting delay duration expiring. Correspondingly, the driving assembly may drive the sliding assembly to slide from the target position to the first position according to the sliding-in instruction. As a result, the sliding assembly may be automatically controlled to slide into the body of the electronic device without needing additional operations from the user, which meets the requirements of the user and improves the user experience.

Based on the above-mentioned embodiments, in order to meet the requirements of the user for personalizing of the sliding speed of the sliding assembly, in some exemplary implementations, in addition to setting the correspondence relationship between the scenario features and the slide-retracting delay duration through the control interface according to the requirements of the user, the user may also set the corresponding relationship between the scenario feature and the sliding speed through the control interface. In this way, it is possible to facilitate the controlling of the sliding assembly to slide from the target position back to the first position by the driving assembly according to or in response to the sliding speed corresponding to the scenario feature subsequently.

Based on the above-mentioned embodiments, in order to meet the requirements of the user for personalizing the sliding duration of the sliding assembly, in some exemplary implementations, in addition to setting the correspondence relationship between the scenario features and the slide-retracting delay duration through the control interface according to the needs, the user may also set the corresponding relationship between the scenario feature and the sliding duration through the control interface. In this way, it is possible to facilitate the controlling of the sliding assembly to slide from the target position back to the first position by the driving assembly according to or in response to the sliding duration corresponding to the scenario feature.

In some embodiments, it should be understood that, the block 601 may be implemented in different ways corresponding to different application scenarios. Some examples may be set forth as follows.

Example One

Figure 8:
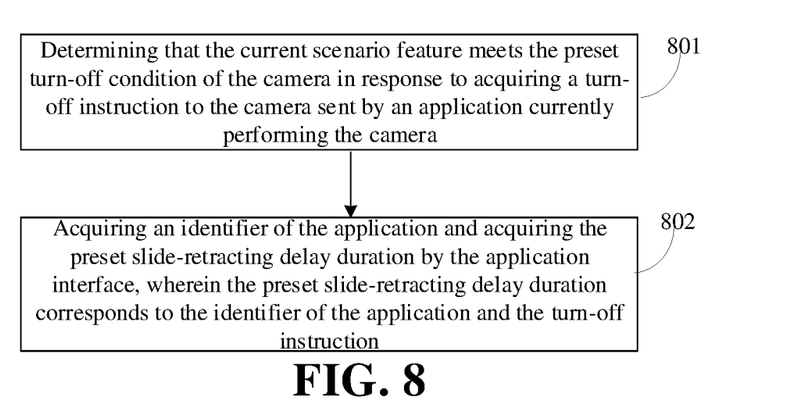
FIG. 8 is a flowchart of block 602 according to some embodiments of the present disclosure.

In this example, as shown in FIG. 8, the block 602 may include operations executed by the following blocks.

At block 801, it may be determined that the current scenario feature meets the preset turn-off condition for the camera in response to acquiring a turn-off instruction to the camera sent by an application currently performing the camera.

At block 802, an identifier of the application may be acquired, and the preset slide-retracting delay duration may be acquired by the application interface. In some embodiments, the preset slide-retracting delay duration may correspond to the identifier of the application and the turn-off instruction.

In some exemplary implementations, after acquiring the identifier of the application, the preset slide-retracting delay duration corresponding to the identifier of the application and the turn-off instruction may be acquired by an Application Programming Interface (API) of the sliding assembly.

More specifically, the slide-retracting delay duration corresponding to the identifier of the application and the turn-off instruction may be acquired based on the prestored identifier of the application and the corresponding relationship between the turn-off instruction and the slide-retracting delay duration.

It should be understood that, in case the identifiers of the applications are different, the corresponding slide-retracting delay durations in response to turning off the camera may be the same or different, which may be not limited in some embodiments of the present disclosure.

In some embodiments, it needs to be understood that in the actual application process, the user may set different slide-retracting delay durations for different applications according to his or her individual needs. More specifically, the user may personalize different slide-retracting delay durations for different applications through the control interface.

For example, in order to meet the personalized needs of the user, the user may set the slide-retracting delay duration of the application A to be 2 seconds, and further set the slide-retracting delay duration of the application B to be 5 seconds.

Example Two

Figure 9:
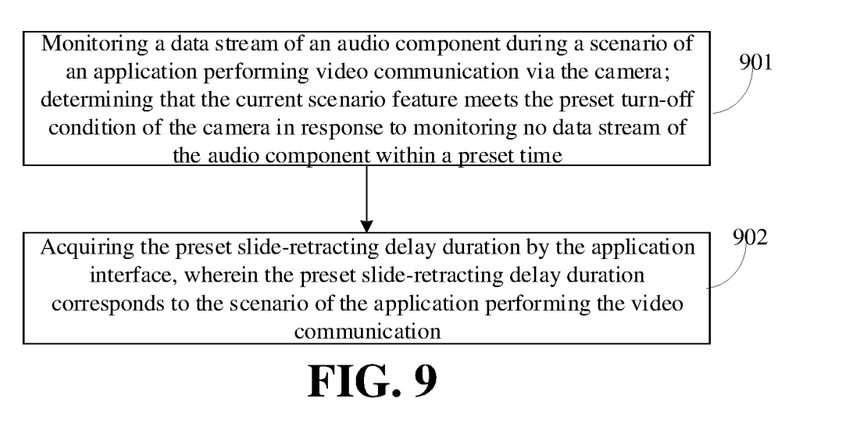
FIG. 9 is another flowchart of block 602 according to some embodiments of the present disclosure.

In this example, as shown in FIG. 9, the block 602 may include operations executed by the following blocks.

At block 901, a data stream of an audio component may be monitored during a scenario of an application performing video communication via the camera. It may be determined that the current scenario feature meets the preset turn-off condition of the camera in response to monitoring no data stream of the audio component within a preset time.

In some embodiments, the preset time may be a time set by default in the electronic device, or may be a time preset by the user in the electronic device according to the requirements of the user. For example, the preset time may be 1 minute.

In the process of the application performing the video communication via or by the camera, the data stream of the audio component may be monitored, and whether there is a data stream in the audio component within the preset time may be detected. In response to detecting no data stream in input and output interfaces of the audio component within the preset time, it may be determined that the current scenario feature meets the preset turn-off condition of the camera.

At block 902, the preset slide-retracting delay duration may be acquired by the application interface. In some embodiments, the preset slide-retracting delay duration corresponds to the scenario of the application performing the video communication.

In some embodiments, the video communication may include, but may not be limited to, video chat, recorded video, video conference, online live broadcast, or the like.

In some embodiments, it needs to be understood that, the sliding assembly may be in the sliding-out state for a long time. Once the sliding assembly falls down, it may be easy to cause damage to the electronic device. In some exemplary implementations, in the process of the application performing the video communication via or by the camera, the data stream of the audio component may be monitored. It may be determined that the current scenario feature meets the preset turn-off conditions of the camera in response to monitoring no data stream of the audio component within the preset time. The preset slide-retracting delay duration may be acquired by the application interface, and the preset slide-retracting delay duration corresponds to the scenario of the application performing the video communication. Besides, timing may be performed until the slide-retracting delay duration expires, and a sliding-in instruction may be sent to the driving assembly in response to the slide-retracting delay duration expiring. In this way, the driving assembly may drive the sliding assembly to slide from the target position to the first position according to or in response to the sliding-in instruction. Therefore, it is possible to control the sliding assembly to slide from the target position back into the body intelligently in combination with the scenario features. The possibility of the occurrences of the sliding assembly being in the sliding-out state for a long time may be reduced. The electronic device may be protected.

In some embodiments, it needs to be understood that in practical applications, the applications with or having video communication functions may all call the video communication functions of the camera. For example, an instant messaging software (such as WeChat, QQ, or the like), a live broadcast software, or the like, which has video communication function, may call the video communication function of the camera.

In order to better control the sliding assembly and meet the differentiated requirements, in some exemplary implementation, in response to monitoring no data stream of the audio component within the preset time, after determining that the current scenario feature meets the preset turn-off condition of the camera, the identifier of the application that performs the video communication via the camera may be acquired, and then the preset slide-retracting delay duration may be acquired by the application interface. In some embodiments, the preset slide-retracting delay duration correspond to the identifier of the application performing the video communication. As a result, the sliding control of the sliding assembly may be achieved in combination with the application that performs the video communication via the camera. The sliding structure may be automatically controlled to slide into the body of the electronic device without needing additional operations from the user in response to the application that performs the video communication meeting the preset turn-off condition of the camera, which meets the requirements of users and improves the user experience.

In some examples, after detecting that the driving assembly drives the sliding assembly to slide out from the first position to the target position and activating the camera, in response to monitoring that the application that calls or performs the camera switches from the foreground to the background, whether the application performing the camera calls the audio component may be determined. Whether the audio component has a data stream within the preset time may be determined in response to the application calling the audio component. It may be determined that the current scenario feature meets the preset turn-off condition of the camera in response to monitoring no data stream of the audio component within a preset time. Otherwise, it may be determined that the current scenario feature meets the preset turn-off condition of the camera in response to the application calling no audio component. After that, the application interface may be called to acquire the preset slide-retracting delay duration corresponding to the identifier of the application, and timing may be performed until the slide-retracting delay duration expires. A sliding-in instruction may be sent to the driving assembly in response to the slide-retracting delay duration expiring. The driving assembly may drive the sliding assembly to slide from the target position to the first position according to or in response to the sliding-in instruction. Therefore, it is possible to control the sliding assembly to slide from the target position back into the body intelligently in combination with the scenario features. Besides, the possibility of the occurrences of the sliding assembly being in the sliding-out state for a long time may be reduced, and the electronic device may be protected.

Figure 10:
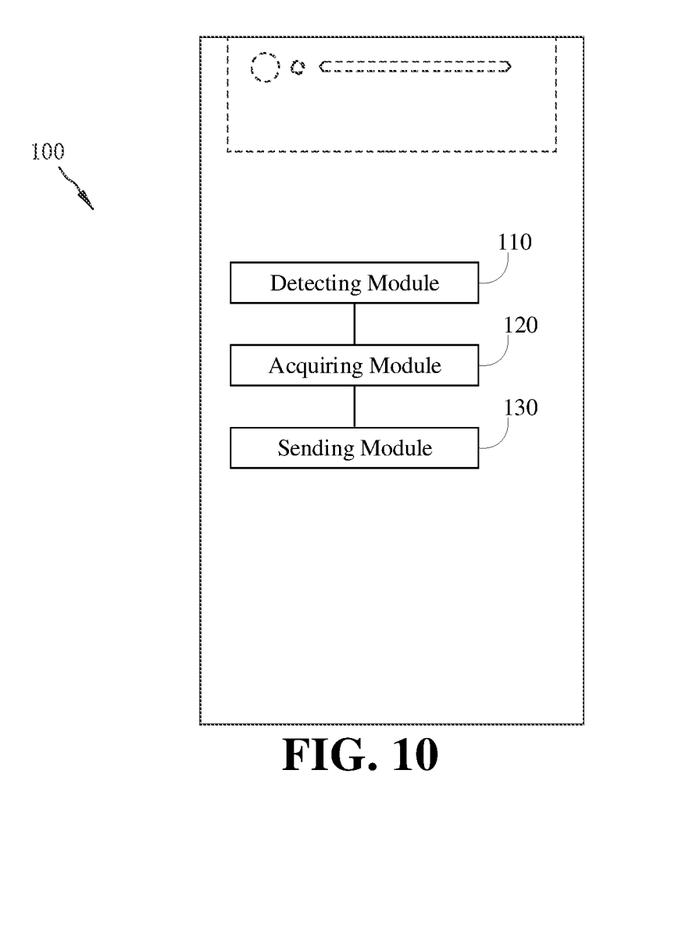
FIG. 10 is a block diagram showing of a sliding control device for the sliding assembly according to some embodiments of the present disclosure.

FIG. 10 is a block diagram showing of a sliding control device for the sliding assembly according to some embodiments of the present disclosure.

In some embodiments, it should be noted that, the sliding control device for the sliding assembly may be applied to an electronic device 100. The electronic device 100 may include a body 10, a sliding assembly 20, and a driving assembly 50. A camera 42 may be disposed on the sliding assembly 20. The sliding assembly 20 may be slidable between a first position A in which the sliding assembly 20 is received in the body 10 and a second position B in which the sliding assembly 20 is exposed from the body 10. As shown in FIG. 10, the sliding control device may include a detecting module 110, an acquiring module 120, and a sending module 130.

The detecting module 110 may be configured to determine whether the current scenario feature meets the preset turn-off condition of the camera, in response to detecting that the driving assembly 50 drives the sliding assembly 20 to slide out from the first position to the target position and activating the camera.

The acquiring module 120 may be configured to acquire a preset slide-retracting delay duration corresponding to the current scenario feature by an application interface in response to the current scenario feature meeting the preset turn-off condition of the camera.

The sending module 130 may be configured to time until the slide-retracting delay duration expires, send a sliding-in instruction to the driving assembly in response to the slide-retracting delay duration expiring, and drive the driving assembly to drive the sliding assembly to slide from the target position to the first position according to or based on or in response to the sliding-in instruction.

In some embodiments of the present disclosure, the sliding control device may further include a providing module and a first acquiring module (not shown in the figures).

The providing module may be configured to provide a control interface.

The first acquiring module may be configured to acquire the corresponding relationship between the scenario feature and the slide-retracting delay duration, and store the corresponding relationship. In some embodiments, the corresponding relationship is preset by the user via the control interface according to the requirement of the user.

In some embodiments of the present disclosure, the acquiring module 120 may be configured to: determine that the current scenario feature meets the preset turn-off condition for the camera in response to acquiring a turn-off instruction to the camera sent by an application currently performing the camera; acquire an identifier of the application; and acquire the preset slide-retracting delay duration by the application interface. In some embodiments, the preset slide-retracting delay duration may correspond to the identifier of the application and the turn-off instruction.

In some embodiments of the present disclosure, the acquiring module 120 may be configured to: monitor a data stream of an audio component during a scenario of an application performing video communication via the camera; determine that the current scenario feature meets the preset turn-off condition of the camera in response to monitoring no data stream of the audio component within a preset time; and acquire the preset slide-retracting delay duration by the application interface. In some embodiments, the preset slide-retracting delay duration corresponds to the scenario of the application performing the video communication.

In some embodiments of the present disclosure, the sliding control device may further include a second acquisition module.

In some embodiments, the second acquiring module may be configured to acquire an identifier of the application, and the application performs the video communication via the camera.

In some embodiments, the acquiring module 120 may be configured to acquire the preset slide-retracting delay duration by an application interface. In some embodiments, the preset slide-retracting delay duration may correspond to the identifier of the application performing the video communication.

In order to better control or drive the sliding of the sliding assembly in combination with the scenario features, in some exemplary embodiments, the sliding control device may further include a third acquiring module (not shown in the figures).

The third acquiring module may be configured to acquire the sliding speed corresponding to the scenario feature before controlling the sliding assembly to slide from the target position back to the first position.

The driving assembly may also be configured to drive the sliding assembly to slide from the target position to the first position according to or based on or in response to the sliding speed corresponding to the scenario feature.

In some examples, it is possible to manage and control the sliding speed of the sliding assembly in combination with the scenario feature. The control of the sliding assembly may be automatically realized in combination with the scenario feature, and the user experience may be improved.

Based on the foregoing embodiments, in order to better control or drive the sliding of the sliding assembly in combination with scenario features, in some exemplary implementations, the sliding control device may also include a fourth acquiring module (not shown in the figures).

The fourth acquiring module may be configured to acquire the sliding duration corresponding to the scenario feature before controlling the sliding assembly to slide from the target position back to the first position.

The driving assembly may also be configured to drive the sliding assembly to slide from the target position to the first position according to or based on or in response to the sliding duration corresponding to the scenario feature.

In some examples, it is possible to manage and control the sliding duration of the sliding assembly in combination with the scenario feature. The control of the sliding assembly may be automatically realized in combination with the scenario feature, and the user experience may be improved.

It should be noted that the foregoing explanations of the embodiments of the electronic device and the sliding control method for the sliding assembly may also be applicable to the sliding control device for the sliding assembly of these embodiments, and will not be repeated here.

In the sliding control device for the sliding assembly according to some embodiments of the present disclosure, in response to detecting that the driving assembly drives the sliding assembly to slide out from the first position to the target position and activating the camera, in case that the current scenario feature meets the preset turn-off condition of the camera, the application interface may be called to acquire the preset slide-retracting delay duration corresponding to the current scenario feature, and timing may be performed until the slide-retracting delay duration expires. The sliding-in instruction may be sent to the driving assembly in response to the slide-retracting delay duration expiring. The driving assembly may be driven to drive the sliding assembly to slide from the target position to the first position according to or in response to the sliding-in instruction. Therefore, the sliding control of the sliding assembly may be realized in combination with the slide-retracting delay duration corresponding to the scenario feature, which meets the requirements of different slide-retracting delay durations used in different scenario features. Besides, the control of the sliding assembly may be automatically realized in combination with the scenario feature, and the user experience may also be improved.

In order to implement the foregoing embodiments, the present disclosure also proposes a non-transitory computer-readable storage medium. The non-transitory computer-readable storage medium stores a computer program. When the program is executed by a processor, the sliding control method for the sliding assembly as described in the foregoing embodiments may be implemented.

In order to implement the above-mentioned embodiments, the present disclosure also proposes a computer program product. When instructions in the computer program product are executed by the processor, the sliding control method for the sliding assembly as described in the above-mentioned embodiments may be executed.

In the description of the present specification, the description with reference to the terms "one embodiment", "some embodiments", "illustrative embodiment", "example", "specific example", or "some examples", or the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples.

Although the embodiments of the present disclosure have been shown and described above, however, those skilled in the art may understand that various changes, modifications, substitutions, and modifications may be made to these embodiments without departing from the principle and purpose of the present disclosure. The scope of the application may be defined by the claims and their equivalents.

What is claimed is:

1. A method of sliding control for a sliding assembly of an electronic device, the electronic device comprising a body and a driving assembly, and the driving assembly being configured to drive the sliding assembly to slide between a first position in which the sliding assembly is received in the body and a second position in which the sliding assembly is exposed from the body; a camera being disposed on the sliding assembly; the method comprising:
    determining whether a current scenario feature meets a preset turn-off condition of the camera in response to detecting that the driving assembly drives the sliding assembly to slide from the first position to a target position and activating the camera;
    acquiring a preset slide-retracting delay duration corresponding to the current scenario feature by an application interface in response to the current scenario feature meeting the preset turn-off condition of the camera;
    timing until the slide-retracting delay duration expires;
    sending a sliding-in instruction to the driving assembly; and
    driving the sliding assembly to slide from the target position to the first position by the driving assembly in response to the sliding-in instruction,
    wherein acquiring the preset slide-retracting delay duration corresponding to the current scenario feature by the application interface in response to the current scenario feature meeting the preset turn-off condition of the camera comprises:
        determining that the current scenario feature meets the preset turn-off condition of the camera in response to acquiring a turn-off instruction to the camera sent by an application currently performing the camera, acquiring an identifier of the application, and acquiring the preset slide-retracting delay duration by the application interface, wherein the preset slide-retracting delay duration corresponds to the identifier of the application and the turn-off instruction; or
        monitoring a data stream of an audio component during a scenario of an application performing video communication via the camera, determining that the current scenario feature meets the preset turn-off condition of the camera in response to monitoring no data stream of the audio component within a preset time, and acquiring the preset slide-retracting delay duration by the application interface, wherein the preset slide-retracting delay duration corresponds to the scenario of the application performing the video communication; or
        determining whether an application calls an audio component in response to monitoring that the application performing the camera switches from a foreground to a background; determining whether the audio component has a data stream within a preset time in response to the application calling the audio component determining that the current scenario feature meets the preset turn-off condition of the camera in response to the application calling no audio component and acquiring the preset slide-retracting delay duration by the application interface in response to the current scenario feature meeting the preset turn-off condition of the camera, wherein the preset slide-retracting delay duration corresponds to an identifier of the application.

2. The method as claimed in claim 1, further comprising:
    providing a control interface;
    acquiring a corresponding relationship between the scenario feature and the slide-retracting delay duration, wherein the corresponding relationship is preset via the control interface; and
    storing the corresponding relationship.

3. The method as claimed in claim 1, wherein the method further comprises:
    after determining that the current scenario feature meets the preset turn-off condition of the camera in response to monitoring no data stream of the audio component within the preset time:
    acquiring an identifier of the application performing the video communication via the camera; and
    acquiring the preset slide-retracting delay duration by the application interface, wherein the preset slide-retracting delay duration corresponds to the identifier of the application performing the video communication.

4. The method as claimed in claim 1, wherein the driving the sliding assembly to slide from the target position to the first position by the driving assembly, comprises:
    acquiring a sliding speed corresponding to the current scenario feature and driving the sliding assembly to slide from the target position to the first position by the driving assembly in response to the sliding speed; or
    acquiring a sliding duration corresponding to the current scenario feature and driving the sliding assembly to slide from the target position to the first position by the driving assembly in response to the sliding duration; or
    determining the sliding speed corresponding to the sliding assembly according to the target position, the first position, and the sliding duration in response to acquiring the sliding duration corresponding to the current scenario feature, and driving the sliding assembly to slide from the target position to the first position by the driving assembly in response to the sliding speed.

5. The method as claimed in claim 1, wherein timing until the slide-retracting delay duration expires, comprises:
    maintaining the sliding assembly to stay at the target position by the driving assembly in response to detecting that the slide-retracting delay duration meets a preset timing-interruption state.

6. An electronic device, comprising:
    a body;
    a sliding assembly, wherein a camera and at least two distance sensors are disposed on the sliding assembly, wherein a line connecting the at least two distance sensors is not perpendicular to a sliding direction of the sliding assembly, and wherein the at least two distance sensors are electrically connected to the processor;
a driving assembly, configured to drive the sliding assembly to slide between a first position in which the sliding assembly is received in the body and a second position in which the sliding assembly is exposed from the body;
a memory;
a processor, electrically connected to the sliding assembly and configured to receive detection signal values of the at least two distance sensors; and
a computer program, stored on the memory and executable by the processor;
wherein the processor performs a sliding control method for the sliding assembly in response to executing the computer program, and the method comprises:
  determining whether a current scenario feature meets a preset turn-off condition of the camera in response to detecting that the driving assembly drives the sliding assembly to slide from the first position to a target position and activating the camera;
  acquiring a preset slide-retracting delay duration corresponding to the current scenario feature by an application interface in response to the current scenario feature meeting the preset turn-off condition of the camera;
  timing until the slide-retracting delay duration expires;
  sending a sliding-in instruction to the driving assembly;
  driving the sliding assembly to slide from the target position to the first position by the driving assembly in response to the sliding-in instruction;
  determine a position of the sliding assembly relative to the body based on the at least two detection signal values.

7. The electronic device as claimed in claim 6, wherein a magnet is disposed on one of the sliding assembly and the body, a magnetic field detector is disposed on the other of the sliding assembly and the body, and the magnetic field detector is electrically connected to the processor.

8. The electronic device as claimed in claim 7, wherein the memory and the processor are arranged on a main board inside the body, and the main board is fixedly connected to the body;
  the magnet is arranged on the sliding assembly, and the magnetic field detector is arranged on the main board; or
  the magnet is arranged on the main board, and the magnetic field detector is arranged on the sliding assembly.

9. The electronic device as claimed in claim 7, wherein the magnetic field detector is a Hall element;
  the processor is configured to receive a detection signal value output by the Hall element and determine a position of the sliding assembly relative to the body based on the detection signal value.

10. The electronic device as claimed in claim 6, wherein the method further comprises:
  providing a control interface;
  acquiring a corresponding relationship between the scenario feature and the slide-retracting delay duration, wherein the corresponding relationship is preset via the control interface; and
  storing the corresponding relationship.

11. The electronic device as claimed in claim 6, wherein acquiring the preset slide-retracting delay duration corresponding to the current scenario feature by the application interface in response to the current scenario feature meeting the preset turn-off condition of the camera, comprises:
  determining that the current scenario feature meets the preset turn-off condition of the camera in response to acquiring a turn-off instruction to the camera sent by an application currently performing the camera, acquiring an identifier of the application, and acquiring the preset slide-retracting delay duration by the application interface, wherein the preset slide-retracting delay duration corresponds to the identifier of the application and the turn-off instruction; or
  monitoring a data stream of an audio component during a scenario of an application performing video communication via the camera, determining that the current scenario feature meets the preset turn-off condition of the camera in response to monitoring no data stream of the audio component within a preset time, and acquiring the preset slide-retracting delay duration by the application interface, wherein the preset slide-retracting delay duration corresponds to the scenario of the application performing the video communication; or
  determining whether an application calls an audio component in response to monitoring that the application performing the camera switches from a foreground to a background;
  determining whether the audio component has a data stream within a preset time in response to the application calling the audio component determining that the current scenario feature meets the preset turn-off condition of the camera in response to the application calling no audio component and acquiring the preset slide-retracting delay duration by the application interface in response to the current scenario feature meeting the preset turn-off condition of the camera, wherein the preset slide-retracting delay duration corresponds to an identifier of the application.

12. The electronic device as claimed in claim 11, wherein after determining that the current scenario feature meets the preset turn-off condition of the camera in response to monitoring no data stream of the audio component within the preset time, the method further comprises:
  acquiring an identifier of the application performing the video communication via the camera; and
  acquiring the preset slide-retracting delay duration by the application interface, wherein the preset slide-retracting delay duration corresponds to the identifier of the application performing the video communication.

13. The electronic device as claimed in claim 6, wherein driving the sliding assembly to slide from the target position to the first position by the driving assembly, comprises:
  acquiring a sliding speed corresponding to the current scenario feature and driving the sliding assembly to slide from the target position to the first position by the driving assembly in response to the sliding speed; or
  acquiring a sliding duration corresponding to the current scenario feature and driving the sliding assembly to slide from the target position to the first position by the driving assembly in response to the sliding duration; or
  determining the sliding speed corresponding to the sliding assembly according to the target position, the first position, and the sliding duration in response to acquiring the sliding duration corresponding to the current scenario feature, and driving the sliding assembly to slide from the target position to the first position by the driving assembly in response to the sliding speed.

14. The electronic device as claimed in claim 6, wherein timing until the slide-retracting delay duration expires, comprises:
　　maintaining the sliding assembly to stay at the target position by the driving assembly in response to detecting that the slide-retracting delay duration meets a preset timing-interruption state.

15. A non-transitory computer-readable storage medium storing a computer program which, when executed by a processor, causes the processor perform a sliding control method for a sliding assembly of an electronic device, the electronic device comprising a body and a driving assembly, and the driving assembly being configured to drive the sliding assembly to slide between a first position in which the sliding assembly is received in the body and a second position in which the sliding assembly is exposed from the body; a camera being disposed on the sliding assembly; the method comprising:
　　determining whether a current scenario feature meets a preset turn-off condition of the camera in response to detecting that the driving assembly drives the sliding assembly to slide from the first position to a target position and activating the camera;
　　acquiring a preset slide-retracting delay duration corresponding to the current scenario feature by an application interface in response to the current scenario feature meeting the preset turn-off condition of the camera;
　　timing until the slide-retracting delay duration expires;
　　sending a sliding-in instruction to the driving assembly; and
　　driving the sliding assembly to slide from the target position to the first position by the driving assembly in response to the sliding-in instruction, comprising:
　　　　acquiring a sliding speed corresponding to the current scenario feature and driving the sliding assembly to slide from the target position to the first position by the driving assembly in response to the sliding speed; or
　　　　acquiring a sliding duration corresponding to the current scenario feature and driving the sliding assembly to slide from the target position to the first position by the driving assembly in response to the sliding duration; or
　　　　determining the sliding speed corresponding to the sliding assembly according to the target position, the first position, and the sliding duration in response to acquiring the sliding duration corresponding to the current scenario feature, and driving the sliding assembly to slide from the target position to the first position by the driving assembly in response to the sliding speed.

16. The non-transitory computer-readable storage medium as claimed in claim 15, wherein the method further comprises:
　　providing a control interface;
　　acquiring a corresponding relationship between the scenario feature and the slide-retracting delay duration, wherein the corresponding relationship is preset via the control interface; and
　　storing the corresponding relationship.

17. The non-transitory computer-readable storage medium as claimed in claim 15, wherein acquiring the preset slide-retracting delay duration corresponding to the current scenario feature by the application interface in response to the current scenario feature meeting the preset turn-off condition of the camera, comprises:
　　determining that the current scenario feature meets the preset turn-off condition of the camera in response to acquiring a turn-off instruction to the camera sent by an application currently performing the camera, acquiring an identifier of the application, and acquiring the preset slide-retracting delay duration by the application interface, wherein the preset slide-retracting delay duration corresponds to the identifier of the application and the turn-off instruction; or
　　monitoring a data stream of an audio component during a scenario of an application performing video communication via the camera, determining that the current scenario feature meets the preset turn-off condition of the camera in response to monitoring no data stream of the audio component within a preset time, and acquiring the preset slide-retracting delay duration by the application interface, wherein the preset slide-retracting delay duration corresponds to the scenario of the application performing the video communication; or
　　determining whether an application calls an audio component in response to monitoring that the application performing the camera switches from a foreground to a background;
　　determining whether the audio component has a data stream within a preset time in response to the application calling the audio component determining that the current scenario feature meets the preset turn-off condition of the camera in response to the application calling no audio component and acquiring the preset slide-retracting delay duration by the application interface in response to the current scenario feature meeting the preset turn-off condition of the camera, wherein the preset slide-retracting delay duration corresponds to an identifier of the application.

18. The non-transitory computer-readable storage medium as claimed in claim 17, wherein after determining that the current scenario feature meets the preset turn-off condition of the camera in response to monitoring no data stream of the audio component within the preset time, the method further comprises:
　　acquiring an identifier of the application performing the video communication via the camera; and
　　acquiring the preset slide-retracting delay duration by the application interface, wherein the preset slide-retracting delay duration corresponds to the identifier of the application performing the video communication.

19. The non-transitory computer-readable storage medium as claimed in claim 15, wherein timing until the slide-retracting delay duration expires, comprises:
　　maintaining the sliding assembly to stay at the target position by the driving assembly in response to detecting that the slide-retracting delay duration meets a preset timing-interruption state.

* * * * *